(12) United States Patent
Zhang et al.

(10) Patent No.: US 11,745,334 B2
(45) Date of Patent: Sep. 5, 2023

(54) SPATIAL LARGE-STROKE COMPLIANT HINGE WITH HYBRID STRUCTURE

(71) Applicant: South China University of Technology, Guangzhou (CN)

(72) Inventors: Xianmin Zhang, Guangzhou (CN); Hongchuan Zhang, Guangzhou (CN); Benliang Zhu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 296 days.

(21) Appl. No.: 17/265,763

(22) PCT Filed: Oct. 10, 2019

(86) PCT No.: PCT/CN2019/110289
§ 371 (c)(1),
(2) Date: Feb. 3, 2021

(87) PCT Pub. No.: WO2020/173096
PCT Pub. Date: Sep. 3, 2020

(65) Prior Publication Data
US 2021/0162586 A1 Jun. 3, 2021

(30) Foreign Application Priority Data
Feb. 26, 2019 (CN) .......................... 201910141050.4

(51) Int. Cl.
| | | |
|---|---|---|
| *B25J 9/10* | (2006.01) | |
| *B25J 17/00* | (2006.01) | |
| *F16C 11/12* | (2006.01) | |
| *B25J 9/00* | (2006.01) | |

(52) U.S. Cl.
CPC ................. *B25J 9/10* (2013.01); *B25J 17/00* (2013.01); *F16C 11/12* (2013.01); *B25J 9/0015* (2013.01)

(58) Field of Classification Search
CPC .. B25J 9/10; B25J 17/00; B25J 9/0015; F16F 1/18; F16C 11/12
USPC .......................................................... 267/160
See application file for complete search history.

(56) References Cited

U.S. PATENT DOCUMENTS

| | | | | |
|---|---|---|---|---|
| 2,793,028 A | * | 5/1957 | Wheeler ................... | F16F 1/02 74/519 |
| 3,653,626 A | * | 4/1972 | Tucker ................... | A63H 18/02 248/371 |
| 3,675,588 A | * | 7/1972 | Gaynor ................... | B61B 11/00 198/442 |

(Continued)

FOREIGN PATENT DOCUMENTS

| | | |
|---|---|---|
| CN | 101387315 A | 3/2009 |
| CN | 101504030 A | 8/2009 |

(Continued)

*Primary Examiner* — William C Joyce
(74) *Attorney, Agent, or Firm* — Hoffmann & Baron, LLP

(57) ABSTRACT

A spatial large-stroke compliant hinge with hybrid structure, which includes a rectangular planar unit for implementing an out-of-plane torsion function and a crossed-shaped planar unit for achieving an in-plane rotation function. The crossed-shaped planar unit is formed by two flexible straight beam thin sheets intersecting into a crossed-shaped structure with an angle, and the rectangular planar unit and the crossed-shaped planar unit are connected through an external connection or an embedded connection.

8 Claims, 6 Drawing Sheets

(56) References Cited

U.S. PATENT DOCUMENTS

| | | | | |
|---|---|---|---|---|
| 4,261,211 A | * | 4/1981 | Haberland | F16D 3/005 403/291 |
| 4,382,709 A | * | 5/1983 | Brown | F16D 3/005 403/291 |
| 4,497,465 A | * | 2/1985 | Yeakley | G02B 7/1821 267/160 |
| 4,533,100 A | * | 8/1985 | Paseri | B64G 1/66 244/173.1 |
| 4,825,713 A | * | 5/1989 | Wilkey | G01C 19/22 74/5 F |
| 6,283,666 B1 | * | 9/2001 | Genequand | F16C 11/12 439/492 |
| 7,044,459 B2 | * | 5/2006 | Watson | F16C 11/12 267/257 |
| 7,832,880 B2 | * | 11/2010 | Craig | A47G 1/215 359/872 |
| 8,400,721 B2 | * | 3/2013 | Bertele | G02B 7/003 359/819 |
| 9,885,393 B2 | * | 2/2018 | Mori | F16D 41/067 |
| 2003/0235460 A1 | | 12/2003 | Moon et al. | |

FOREIGN PATENT DOCUMENTS

| | | |
|---|---|---|
| CN | 106128512 A | 11/2016 |
| CN | 109207343 A | 1/2019 |
| CN | 109323090 A | 2/2019 |
| CN | 109732584 A | 5/2019 |

* cited by examiner

SPATIAL LARGE-STROKE COMPLIANT HINGE WITH HYBRID STRUCTURE

CROSS-REFERENCE TO RELATED APPLICATIONS

This application is the U.S. National Phase of International Patent Application No. PCT/CN2019/110289, filed on 10 Oct. 2019, which claims benefit of Chinese Patent Application No. 201910141050.4, filed on 26 Feb. 2019, the contents of which are incorporated herein by reference in their entirety.

BACKGROUND

Field

The invention relates to the technical field of a compliant mechanism, in particular to a spatial large-stroke compliant hinge with hybrid structure.

Related Art

Compliant mechanisms refer to a type of mechanisms that use their own elastic deformation to transmit input force or displace. The advantages of compliant mechanisms such as no gap, no lubrication, no assembly required, high precision and high stiffness have been discovered by scholars and widely used in aerospace, mechanical engineering, robot science, medical equipment and other fields. One of the mainstream design methods of compliant mechanisms is the pseudo-rigid-body method. Its basic idea is to replace rigid hinges of traditional rigid mechanisms with corresponding compliant hinges, then forms corresponding compliant mechanisms. Therefore, the design of compliant hinges and the design of new spatial compliant mechanisms have always been the focus and hotspot of the study of mechanisms.

In recent years, with the application and development of compliant mechanisms in the field of Micro-electromechanical Systems, various types of compliant hinges and compliant mechanisms with planar structures have been proposed. However, most of the compliant hinges or mechanisms, of a planar structure, can only achieve movement in the plane where the structure is located, and compliant mechanisms and hinges with spatial motion capabilities are often not simple planar structures. This makes it difficult to process spatial compliant mechanisms or compliant hinges, and it is not easy to achieve small-scale processing or manufacturing. LET (Lamina Emergent Torsional Joint) compliant hinges and LEMs (Lamina Emergent Mechanisms) compliant mechanisms formed by LET compliant hinges have the characteristics of achieving out-of-plane motion through a special planar structure. This type of compliant mechanism has attracted wide awareness and attention from scholars in the field of compliant mechanism (see patent U.S. Pat. No. 9,157,497 B1 for details). The LET compliant hinge is specifically a planar structure with a narrow rectangular shape formed by processing by thin sheet material. It can realize out-of-plane rotation and is a new type of compliant hinge with a single degree of freedom. The LEMs compliant mechanism is a compliant mechanism formed by LET compliant hinges. This type of compliant mechanism also has the characteristics of achieving out-of-plane space movement through a planar structure. Both the LET compliant hinge and the LEMs compliant mechanism can achieve large deformation, and their processing is simple, and can use conventional methods (such as wire cutting, 3D printing, laser cutting) to manufacture macro-scale mechanism or equipment, or can use micro-processing technology in the field of MEMS (Micro-Electro-Mechanical System) to manufacture micro-scale mechanism or equipment.

The LET hinges and LEMs mechanisms provide new ideas for the need to realize the spatial compliant mechanisms with spatial movement function, and the spatial micro-compliant mechanisms, but because the LET compliant hinges are equivalent to joints with a single degree of freedom of rigid mechanisms, this often makes equivalent rigid mechanisms of LEMs compliant mechanisms formed by LET compliant hinge a spatial mechanism with less degree of freedom formed by low pairs. Therefore, in the design of a large-stroke spatial compliant mechanism with multi degrees of freedom with a planar sheet composite, the LET compliant hinge has certain limitations, such as the Delta mechanism, Gough-Stewart mechanism that require joints with multi degrees of freedom, the rotational multi-stable compliant mechanism in Chinese Patent Application No. 201810223057.6 cannot form the above-mentioned equivalent compliant mechanism with only LET compliant hinges.

SUMMARY

The purpose of the invention is to overcome the problems that existing planar structure compliant hinge can only be equivalent to a large-stroke low pair with single degree of freedom, and existing LEMs compliant mechanism is equivalent to compliant hinge with multiple degrees of freedom and with smaller overall strokes, and to propose a spatial large-stroke compliant hinge with hybrid structure. It has the advantages of simple structure, easy processing, easy analysis and calculation, equivalent large stroke space and multiple degrees of freedom flexibility, etcetera.

In order to achieve the above objectives, the technical solutions proposed by the present invention are: a compliant hinge with a spatial large-stroke compliant hinge with hybrid structure, comprising a rectangular planar unit connected to a crossed-shaped planar unit; the rectangular planar unit is used to realize an out-of-plane torsion function, the rectangular planar unit is formed by a rectangular structure surrounded by two flexible long straight beams and two flexible short straight beams; wherein a center of a long straight beam is a fixed section, its two ends are a first torsion section; and the center of another long straight beam is a second torsion section, and its two ends are a third torsion section; the crossed-shaped planar unit is used to realize an in-plane rotation function; the crossed-shaped planar unit is a crossed-shaped structure formed by two flexible and intersecting straight beam thin sheets, an outer side of the crossed-shaped structure and the second torsion section are connected by an external connection to form a triangular structure with a high stiffness and a stable structure, which is used to connect the crossed-shaped structure and the rectangular structure, and to transmit torque.

Further, the rectangular planar unit is a narrow rectangular structure, that is, a length-to-width ratio of the long straight beams and the short straight beams is large, so that a torsional stiffness of the long straight beams is reduced, and a large range of bending deformation outside a plane of the rectangular planar unit can be achieved, and a ratio of a width of a long straight beam to a thickness of an entire compliant hinge does not exceed 0.35; an angle between the crossed-shaped structure formed by the two straight beam thin sheets facing a long straight beam is 30 to 90 degrees, and a width of the straight beam thin sheets is similar to the width of the long straight beam, and a ratio thereof and the thickness of the entire compliant hinge does not exceed 0.31, so that a torsional flexibility of the rectangular planar unit is comparable to a rotational flexibility of the crossed-shaped planar unit.

Further, a length of the first torsion section is greater than a length of the short straight beams, and a width of the first torsion section is less than a width of the short straight beams, a ratio of the width of the first torsion section and a thickness of the entire compliant hinge is 0.1 to 0.35, a length of the straight beam thin sheet is equal to a length of the fixed section and a length of the second torsion section, and a deformation length is not more than 1.414 times the length of the fixed section, a ratio of the width of the straight beam thin sheet to the thickness of the entire compliant hinge is 0.1 to 0.25.

Further, a ratio of the torsional flexibility of the rectangular planar unit to a bending flexibility of the crossed-shaped planar unit is 0.2 to 1.

A spatial large-stroke compliant hinge with hybrid structure, comprising a rectangular planar unit connected to a crossed-shaped planar unit with connecting beams; the rectangular planar unit is used to realize an out-of-plane torsion function, the rectangular planar unit is formed by a rectangular structure surrounded by two flexible long straight beams and two flexible short straight beams; wherein a center of a long straight beam is a fixed section, its two ends are a first torsion section; and the center of another long straight beam is a second torsion section, and its two ends are a third torsion section; the crossed-shaped planar unit with connecting beams is used to realize an in-plane rotation function; the crossed-shaped planar unit is a crossed-shaped structure formed by two flexible and intersecting straight beam thin sheets, the connecting beams connect two ends of the crossed-shaped structure close to a side of the rectangular structure; a center of the connecting beams is a fourth torsion section, its two sides are a fifth torsion section, an inner side of the crossed-shaped structure, that is, the fourth torsion section and the second torsion section are connected through embedded connection to form a triangular structure; and an outer side of the crossed-shaped structure is not connected to any structure; the triangular structure is used to connect the crossed-shaped structure and the rectangular structure and to transmit torque, and a portion of the triangular structure on the straight beam thin sheets can realize in-plane bending deformation, and its portion connected with the rectangular structure realize out-of-plane torsion deformation.

Further, the rectangular planar unit is a narrow rectangular structure, that is, a length-to-width ratio of the long straight beams and the short straight beams is large, so that a torsional stiffness of the long straight beams is reduced, and a large range of bending deformation outside a plane of the rectangular planar unit can be achieved, and a ratio of a width of a long straight beam to a thickness of an entire compliant hinge does not exceed 0.35; an angle between the crossed-shaped structure formed by the two straight beam thin sheets facing a long straight beam is 30 to 90 degrees, and a width of the straight beam thin sheets is similar to the width of the long straight beam, and a ratio thereof and the thickness of the entire compliant hinge does not exceed 0.31, so that a torsional flexibility of the rectangular planar unit is comparable to a rotational flexibility of the crossed-shaped planar unit.

Further, a length of the first torsion section is greater than a length of the short straight beams, and a width of the first torsion section is less than a width of the short straight beams, a ratio of the width of the first torsion section and a thickness of the entire compliant hinge is 0.1 to 0.35, a length of the straight beam thin sheet is equal to a length of the fixed section and a length of the second torsion section, and a deformation length is not more than 1.414 times the length of the fixed section, a ratio of the width of the straight beam thin sheet to the thickness of the entire compliant hinge is 0.1 to 0.25.

Further, a ratio of the torsional flexibility of the rectangular planar unit to a bending flexibility of the crossed-shaped planar unit is 0.2 to 1.

Compared with the prior art, the present invention has the following advantages and beneficial effects:

1. The present invention can be equivalent to a rotating joint with two degrees of freedom. Not only can it realize a large-scale in-plane rotation through the bending of the crossed-shaped planar unit, but also achieve a large-scale out-of-plane rotation through the torsional deformation of the rectangular planar unit.

2. The rectangular planar unit of the present invention has a narrow rectangular structure. The torsional stiffness of the long straight beam is reduced, and large-scale bending deformation outside the plane of the rectangular planar unit can be achieved.

3. The compliant mechanism of the present invention can achieve large out-of-plane deformation and movement, and has one or more degrees of freedom in the plane.

DETAILED DESCRIPTION

The present invention will be further described below with reference to specific embodiments.

Figure 1:
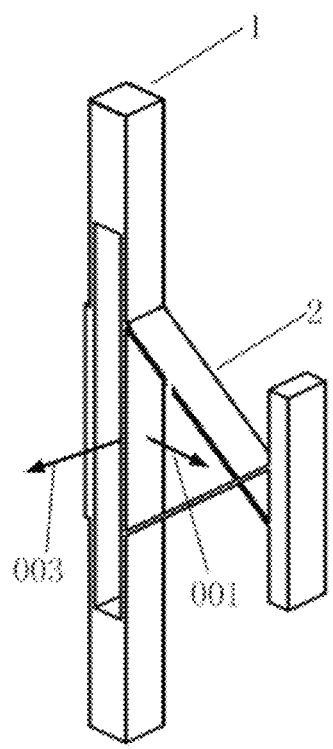
FIG. 1 is a perspective structural view of a compliant hinge of the present invention with an external connection.
Figure 2:
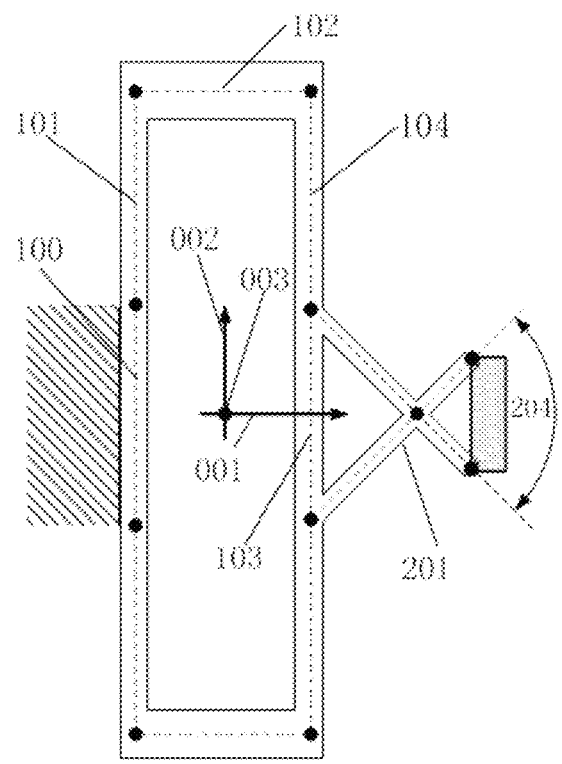
FIG. 2 is a plan structural view of a compliant hinge of the present invention with an external connection.

As shown in FIGS. 1 and 2, a spatial large-stroke compliant hinge with hybrid structure proposed in this embodiment comprises a rectangular planar unit 1 connected to a crossed-shaped planar unit 2, and the rectangular planar unit 1 is used to realize an out-of-plane torsion function, the rectangular planar unit 1 is formed by a rectangular structure surrounded by two flexible long straight beams and two flexible short straight beams 102, a center of a long straight beam is a fixed section 100, its two ends are a first torsion section 101, the center of another long straight beam is a second torsion section 103, and its two ends are a third torsion section 104; the crossed-shaped planar unit 2 is to realize an in-plane rotation function, the crossed-shaped planar unit 2 is a crossed-shaped structure formed by two flexible and intersecting straight beam thin sheets 201, an outer side of the crossed-shaped structure and the second torsion section 103 are connected by an external connection to form a triangular structure with a high stiffness and a stable structure, which is used to connect the crossed-shaped structure and the rectangular structure, and to transmit torque. The main feature of the present invention is that it can be equivalent to a rotation joint with two degrees of freedom, which can realize a large-scale in-plane rotation through the bending of the crossed-shaped planar unit 2. The large-scale in-plane rotation refers to a large range of rotational movement on the plane where the structure of the invention is, in its initial state. It can also realize large-scale out-of-plane rotation through the torsional deformation of the rectangular planar unit 1. The large-scale out-of-plane rotation refers to a large-scale rotation motion outside the plane where the structure of the invention is, in its initial state, and the equivalent rotation axis is perpendicular to the plane normal vector.

In the whole deformation process, a compliant hinge with external connections has a larger bending in-plane deformation and a smaller torsional out-of-plane deformation of the triangular structure. The rectangular planar unit 1 can only be around the Y-axis 002 and the crossed-shaped planar unit 2 can only be around the Z-axis 003 to rotate and deform. Through these two deformations, the present invention has the ability to decouple large spatial deformation. The main deformation part is the first torsion section 101 of the long straight beam, and its main function is to make the entire rectangular planar unit 1 have only rotation ability around the Y-axis 002, so the rotational flexibility of the rectangular planar unit 1 along the Y-axis 002 is significantly greater than its rotational flexibility along the X-axis 001 and Z-axis 003. The crossed-shaped planar unit 2 mainly realizes rotation around the Z-axis 003, thus the rotational compliance of the crossed-shaped planar unit 2 along the Z-axis 003 is significantly greater than the rotational compliance along the X-axis 001 and Y-axis 002.

In order to achieve the above performance, the geometric relationship needs to be constrained as follows:

1) The rectangular planar unit 1 is a narrow rectangular structure, that is, a length-to-width ratio of the long straight beams and the short straight beams 102 is large, so that a torsional stiffness of the long straight beams is reduced, and a large range of bending deformation outside a plane of the rectangular planar unit 1 can be achieved, where a length of the first torsion section 101 is also greater than a length of the short straight beams 102, and a width of the first torsion section 101 is less than a width of the short straight beams 102, the width of first torsion section 101 is less than the thickness of the entire hinge. Considering the complexity in processing, a ratio of the width of the first torsion section 101 and a thickness of the entire compliant hinge is 0.1 to 0.35.

2) An angle 204 between the crossed-shaped structure formed by the two straight beam thin sheets 201 facing a long straight beam is 30 to 90 degrees. A width of the straight beam thin sheets 201 is similar to the width of the long straight beam, and a ratio thereof and the thickness of the entire compliant hinge does not exceed 0.31. Considering the complexity in processing, the ratio of their values should be 0.1 to 0.25, so that the torsional flexibility of the rectangular planar unit 1 is equivalent to that of the crossed-shaped planar unit 2. A length of the straight beam thin sheet 201 is equal to a length of the fixed section 100 and a length of the second torsion section 103, and its deformation length is not more than 1.414 times the length of the fixed section 100.

Considering that the rectangular planar unit 1 can increase flexibility through connection in series, a ratio of the torsional flexibility of the rectangular planar unit 1 to a bending flexibility of the crossed-shaped planar unit 2 is 0.2 to 1. Finally, by optimizing each size parameter through conditional constraints, a compliant hinge with external connections that meet the above requirements can be obtained.

Figure 3:
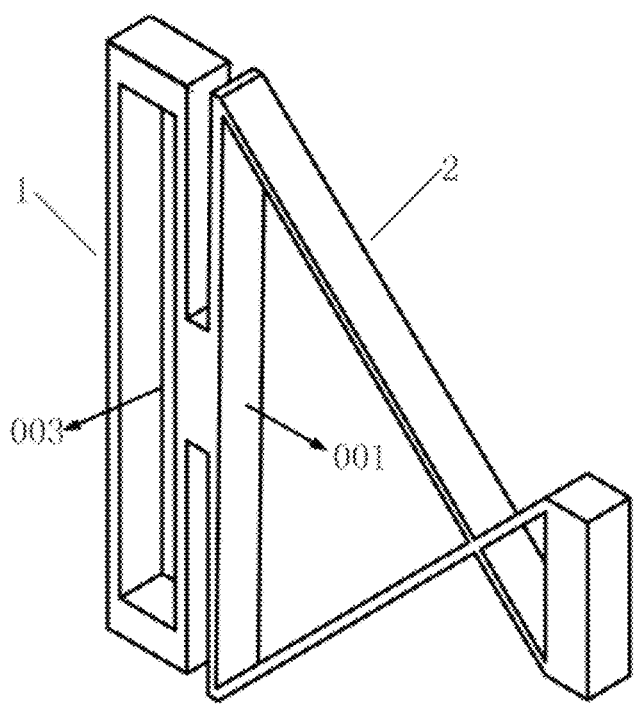
FIG. 3 is a perspective structural view of a compliant hinge of the present invention with embedded connection.
Figure 4:
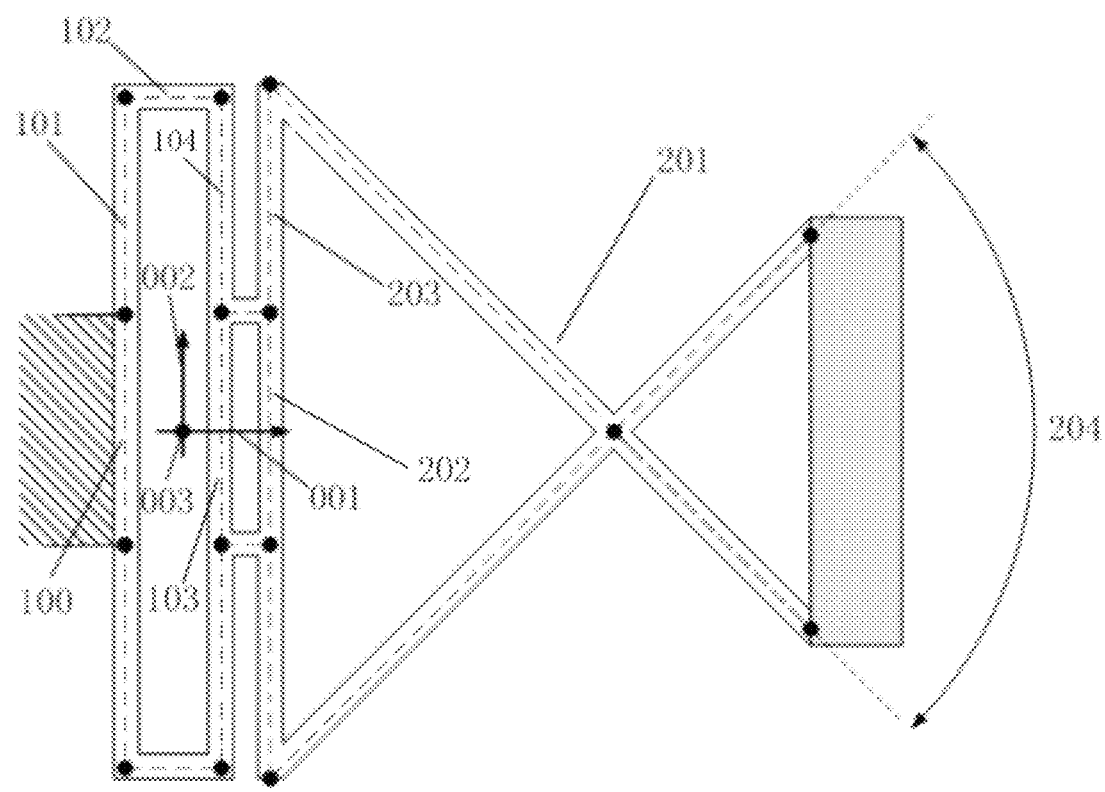
FIG. 4 is a plan structural view of a compliant hinge of the present invention with embedded connection.

As shown in FIG. 3 and FIG. 4, another spatial large-stroke compliant hinge with hybrid structure proposed in this embodiment comprises a rectangular planar unit 1 connected to a crossed-shaped planar unit 2 with connecting beams; the rectangular planar unit 1 is used to realize an out-of-plane torsion function, the rectangular planar unit 1 is formed by of two a rectangular structure surrounded by two flexible long straight beams and two flexible short straight beams 102; wherein a center of a long straight beam is a fixed section 100, its two ends are a first torsion section 101; and the center of another long straight beam is a second torsion section 103, and its two ends are a third torsion section 104; the crossed shaped planar unit 2 with connecting beams is used to realize an in-plane rotation function; the crossed-shaped planar unit 2 is a crossed-shaped structure formed by two flexible and intersecting straight beam thin sheets 201, the connecting beams connect two ends of the crossed-shaped structure close to a side of the rectangular structure; a center of the connecting beams is a fourth torsion section 202, its two sides are a fifth torsion section 203, an inner side of the crossed-shaped structure, that is, the fourth torsion section 202 and the second torsion section 103 are connected through embedded connection to form a triangular structure; and an outer side of the crossed-shaped structure is not connected to any structure; the triangular structure is used to connect the crossed-shaped structure and the rectangular structure and to transmit torque, and a portion of the triangular structure on the straight beam thin sheets 201 can realize in-plane bending deformation, and its portion connected with the rectangular structure realize out-of-plane torsion deformation. The main feature of the present invention is that it can be equivalent to a rotation joint with two degree of freedom, which can realize a large-scale in-plane rotation through the bending of the crossed-shaped planar unit 2. The large-scale in-plane rotation refers to a large range of rotational movement on the plane where the structure of the invention is, in its initial state. It can also realize large-scale out-of-plane rotation through the torsional deformation of the rectangular planar unit 1. The large-scale out-of-plane rotation refers to a large-scale rotation motion outside the plane where the structure of the invention is, in its initial state, and the equivalent rotation axis is perpendicular to the plane normal vector.

During the whole deformation process of a compliant hinge with embedded connection, the main deformation part is the first torsion section 101 of the long straight beam and the fifth torsion section 203 inside the crossed-shaped planar unit 2. Its main function is to make the entire rectangular planar unit 1 have only rotation ability around the Y-axis 002. The rotational flexibility of the rectangular planar unit 1 along the Y-axis 002 is also greater than its rotational flexibility along the X-axis 001 and the Z-axis 003. The crossed-shaped planar unit 2 mainly realizes rotation around the Z-axis 003, so the crossed-shaped planar unit 2 along the Z-axis 003 also has greater rotational flexibility along the X-axis 001 and Y-axis 002.

In order to achieve the above performance, the geometric relationship needs to be constrained as follows:

1) The rectangular planar unit 1 is a narrow rectangular structure, that is, a length-to-width ratio of the long straight beams and the short straight beams 102 is large, so that a torsional stiffness of the long straight beams is reduced, and a large range of bending deformation outside a plane of the rectangular planar unit 1 can be achieved. A length of the first torsion section 101 is also greater than a length of the short straight beams 102. A width of the first torsion section 101 is less than a width of the short straight beams 102. The width of first torsion section 101 is less than the thickness of the entire hinge. Considering the complexity in processing, a ratio of the width of the first torsion section 101 and a thickness of the entire compliant hinge is 0.1 to 0.35.

2) An angle 204 between the crossed-shaped structure formed by the two straight beam thin sheets 201 facing a long straight beam is 30 to 90 degrees. A width of the straight beam thin sheets 201 is similar to the width of the long straight beam, and a ratio thereof and the thickness of the entire compliant hinge does not exceed 0.31. Considering the complexity in processing, the ratio of their values should be 0.1 to 0.25, so that the torsional flexibility of the rectangular planar unit 1 is equivalent to that of the crossed-shaped planar unit 2. A length of the straight beam thin sheet 201 is equal to a length of the fixed section 100 and a length of the second torsion section 103, and its deformation length is not more than 1.414 times the length of the fixed section 100.

Considering that the rectangular planar unit 1 can increase flexibility through connection in series direction, a ratio of the torsional flexibility of the rectangular planar unit 1 to a bending flexibility of the crossed-shaped planar unit 2 is 0.2 to 1. Finally, by optimizing each size parameter through conditional constraints, a compliant hinge with embedded connection that meet the above requirements can be obtained.

After the above two compliant hinges with external connection or embedded connection meet the above requirements, they can also adjust specific flexibility values of the entire structure through fine-tuning of parameters or size optimization according to the actual working conditions to obtain the final structural parameter value of the compliant hinge.

A combination of compliant hinges with external connection or embedded connection according to the present invention and other traditional planar hinges connected in series or parallel can achieve large out-of-plane deformation and movement, and has one or more degrees of planar freedom. Through thought equivalent of rigid body substitution method such as multi-stable flip mechanism and delta mechanism, a spatial large-stroke compliant deployable mechanism with multi-freedom motion characteristics is obtained.

Figure 5:
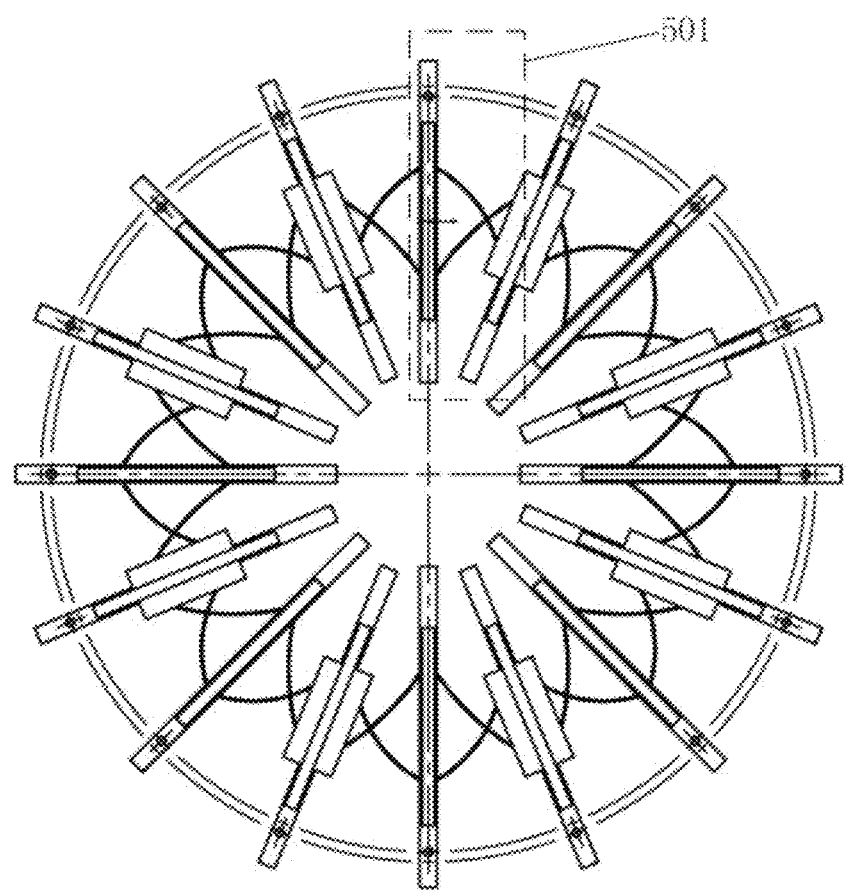
FIG. 5 is a plan structural view diagram of a rotational multistable compliant mechanism designed by using the present invention.
Figure 6:
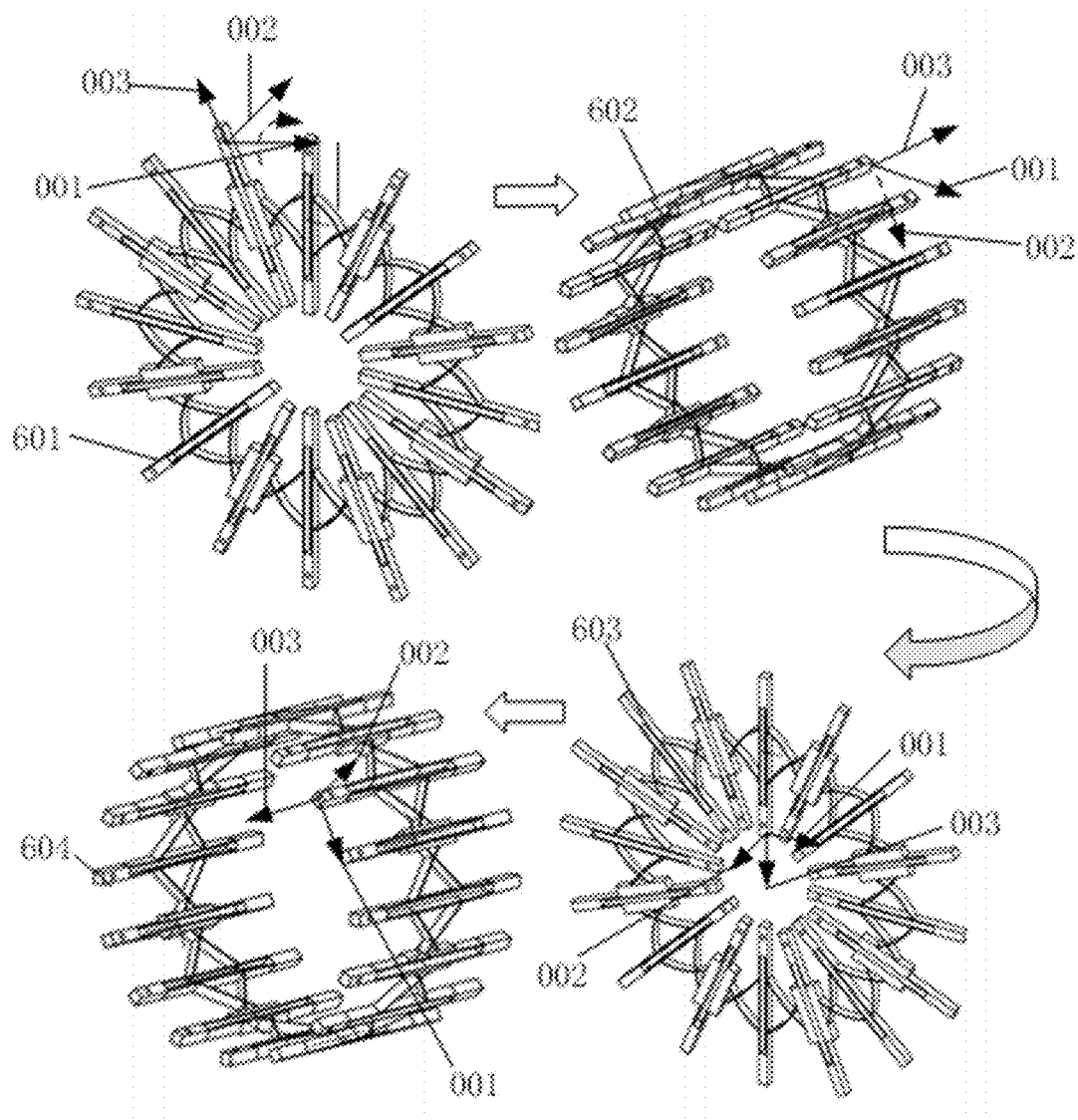
FIG. 6 is a diagram of four stable states of the above-mentioned rotational multistable compliant mechanism.

The invention is equivalent to a hinge with two degrees of freedom, and the rotational flexibility in both directions is equivalent, so it can be used in the rotational multi-stable compliant mechanism described in the Chinese Patent Application No. 201810223057.6. As shown in FIG. 5, reference no. 501 is a set of deformation units of the rotational mechanism, that is, a spatial large-stroke compliant hinge with hybrid structure proposed by the present invention. Through theoretical analysis and experimental verification, the compliant hinge of the present invention made using ABS engineering plastics can rotate 22.5 degrees in all directions, so only 16 compliant hinges of the present invention in series is required to design the rotational multi-stable compliant mechanism described in the Chinese Patent Application No. 201810223057.6. The rotational multi-stable state compliant mechanism has four stable states, and the stable states are as shown in FIG. 6 as reference nos. 601, 602, 603, and 604. Through X-axis 001, Y-axis 002, and Z-axis 003, the directions of deformation of the overall structure can be distinguished from the figure.

Figure 7:
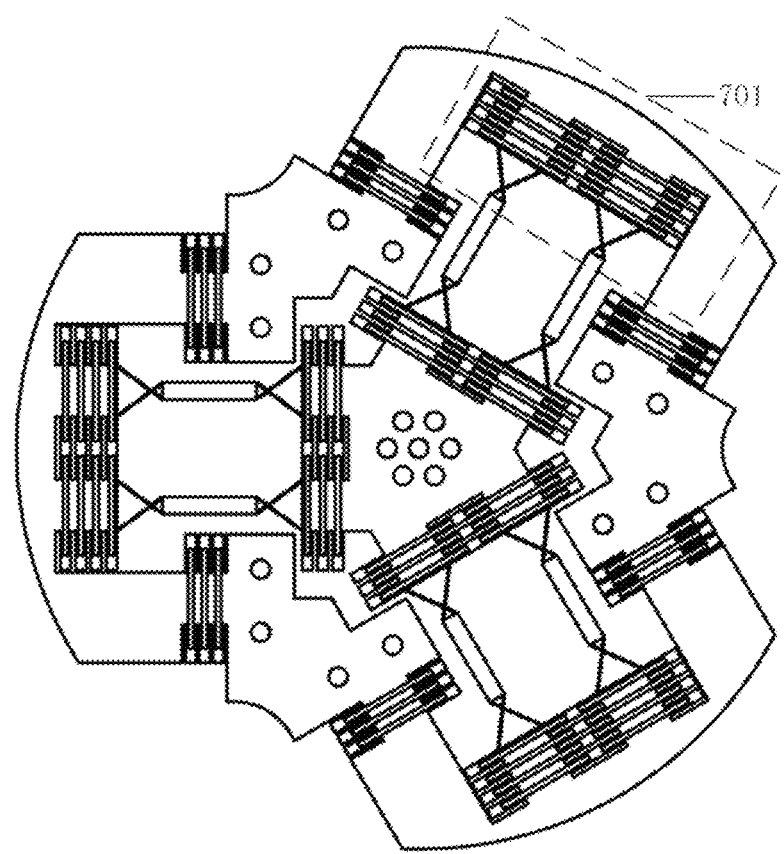
FIG. 7 is a top view of a flexibly deployable delta mechanism designed by using the equivalent of the present invention.

FIG. 7 is a top view of a deployable compliant delta mechanism designed by using the equivalent compliant hinges of the present invention, collapsed into a planar form. Reference no. 701 is a Hook hinge part at end links of the delta mechanism designed by using the compliant hinge of the present invention. It can be seen from the figure that this planar structure greatly simplifies the processing technology of the delta mechanism.

Figure 8:
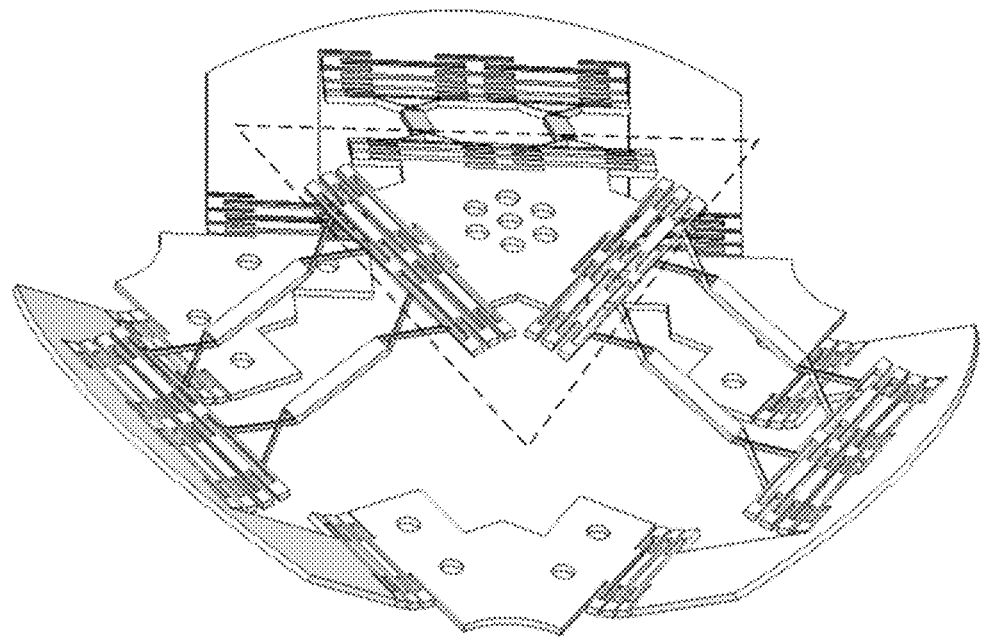
FIG. 8 is a first working diagram of the above-mentioned flexible deployable delta mechanism in expanded form.
Figure 9:
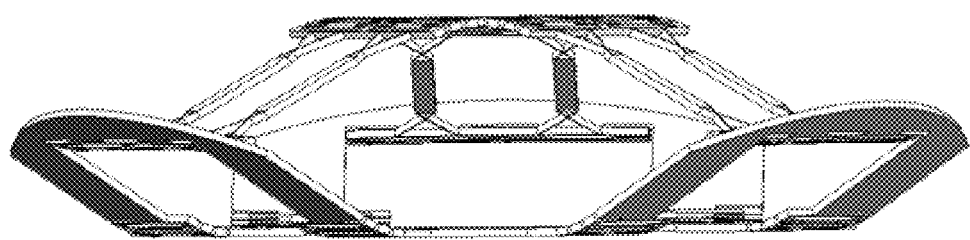
FIG. 9 is a second expanded working diagram of the above-mentioned flexible deployable delta mechanism in expanded form.

As shown in FIGS. 8 and 9, there are two expanded forms of a deployable compliant delta mechanism designed by using the equivalent compliant hinges of the present invention. After the mechanism is expanded, it can achieve three directions of movement in the X, Y, and Z directions of the space. It has the advantages of large displacement, small inertial mass of the moving platform, and high positioning accuracy.

The above-mentioned embodiments are only preferred embodiments of the present invention, and are not intended to limit the scope of the present invention. Therefore, any changes made according to the shape and principle of the present invention should be included in the protection scope of the present invention.

The invention claimed is:

1. A spatial large-stroke compliant hinge with hybrid structure, the hinge comprising a rectangular planar unit connected to a crossed-shaped planar unit, the rectangular planar unit used to realize an out-of-plane torsion function, the rectangular planar unit formed by a rectangular structure surrounded by two flexible long straight beams and two flexible short straight beams, wherein a center of a first long straight beam is a fixed section, two ends of the first long straight beam are a first torsion section; and a center of a second long straight beam is a second torsion section, two ends of the second long straight beam are a third torsion section, the cross-shaped planar unit used to realize an in-plane rotation function, the crossed-shaped planar unit is a crossed-shaped structure formed by two flexible and intersecting straight beam thin sheets, an outer side of the crossed-shaped structure and the second torsion section connected by an external connection to form a triangular structure with a high stiffness and a stable structure, the triangular structure used to connect the crossed-shaped structure and the rectangular structure, and to transmit torque.

2. The spatial large-stroke compliant hinge with hybrid structure according to claim 1, wherein the rectangular planar unit is a narrow rectangular structure having a length-to-width ratio of the long straight beams and the two flexible short straight beams so that a torsional stiffness of the long straight beams is reduced, and a range of bending deformation outside a plane of the rectangular planar unit is achievable, and a ratio of a width of the two long straight beams to a thickness of the entire compliant hinge does not exceed 0.35, an angle between the crossed-shaped structure formed by the two straight beam thin sheets facing the second long straight beam is 30 to 90 degrees, and a width of the two straight beam thin sheets is similar to the width of the two long straight beams, and a ratio of the width of the two straight beam thin sheets to the thickness of the entire compliant hinge does not exceed 0.31, so that a torsional flexibility of the rectangular planar unit is comparable to a rotational flexibility of the crossed-shaped planar unit.

3. The spatial large-stroke compliant hinge with hybrid structure according to claim 2, wherein a length of the first torsion section is greater than a length of the two flexible short straight beams, and a width of the first torsion section is less than a width of the two flexible short straight beams, a ratio of the width of the first torsion section and a thickness of the entire compliant hinge is 0.1 to 0.35, a length of a straight beam thin sheet of the two straight beam thin sheets is equal to a length of the fixed section and a length of the second torsion section, and a deformation length is not more than 1.414 times the length of the fixed section, a ratio of the width of the two straight beam thin sheets to the thickness of the entire compliant hinge is 0.1 to 0.25.

4. The spatial large-stroke compliant hinge with hybrid structure according to claim 1, wherein a ratio of the torsional flexibility of the rectangular planar unit to a bending flexibility of the crossed-shaped planar unit is 0.2 to 1.

5. A spatial large-stroke compliant hinge with hybrid structure, the hinge comprising a rectangular planar unit connected to a crossed-shaped planar unit with connecting beams; the rectangular planar unit used to realize an out-of-plane torsion function, the rectangular planar unit formed by a rectangular structure surrounded by two flexible long straight beams and two flexible short straight beams, wherein a center of a first long straight beam is a fixed section, two ends of the first long straight beam are a first torsion section; and a center of a second long straight beam is a second torsion section, and two ends of the second long straight beam are a third torsion section, the crossed-shaped planar unit with connecting beams used to realize an in-plane rotation function, the crossed-shaped planar unit is a crossed-shaped structure formed by two flexible and intersecting straight beam thin sheets, the connecting beams connect two ends of the crossed-shaped structure close to a side of the rectangular structure, a center of the connecting beams is a fourth torsion section, two sides of the cross-shaped structure are a fifth torsion section, an inner side of the crossed-shaped structure, that is, the fourth torsion section and the second torsion section connected through embedded connection to form a triangular structure, and an outer side of the crossed-shaped structure is not connected to any structure, the triangular structure used to connect the crossed-shaped structure and the rectangular structure and to transmit torque, and a portion of the triangular structure on the straight beam thin sheets provide ability to realize in-plane bending deformation, and its portion connected with the rectangular structure realize out-of-plane torsion deformation.

6. The spatial large-stroke compliant hinge with hybrid structure according to claim 5, wherein the rectangular planar unit is a narrow rectangular structure having a length-to-width ratio of the two flexible long straight beams and the two flexible short straight beams so that a torsional stiffness of the long straight beams is reduced, and a range of bending deformation outside a plane of the rectangular planar unit is achievable, and a ratio of a width of the two flexible long straight beams to a thickness of the entire compliant hinge does not exceed 0.35, an angle between the crossed-shaped structure formed by the two straight beam thin sheets facing the second long straight beam is 30 to 90 degrees, and a width of the two straight beam thin sheets is similar to the width of the two flexible long straight beams, and a ratio of the width of the two straight beam thin sheets to the thickness of the entire compliant hinge does not exceed 0.31, so that a torsional flexibility of the rectangular planar unit is comparable to a rotational flexibility of the crossed-shaped planar unit.

7. The spatial large-stroke compliant hinge with hybrid structure according to claim 6, wherein a length of the first torsion section is greater than a length of the two flexible short straight beams, and a width of the first torsion section is less than a width of the two flexible short straight beams, a ratio of the width of the first torsion section and a thickness of the entire compliant hinge is 0.1 to 0.35, a length of the straight beam thin sheet is equal to a length of the fixed section and a length of the second torsion section, and a deformation length is not more than 1.414 times the length of the fixed section, a ratio of the width of the two straight beam thin sheets to the thickness of the entire compliant hinge is 0.1 to 0.25.

8. The spatial large-stroke compliant hinge with hybrid structure according to claim 5, wherein a ratio of the torsional flexibility of the rectangular planar unit to a bending flexibility of the crossed-shaped planar unit is 0.2 to 1.

* * * * *